(12) United States Patent
Chihara et al.

(10) Patent No.: US 7,124,371 B1
(45) Date of Patent: Oct. 17, 2006

(54) GUI SCREEN GENERATING APPARATUS, GUI SCREEN GENERATING METHOD AND STORAGE MEDIUM RECORDING GUI SCREEN GENERATING PROGRAM

(75) Inventors: Takao Chihara, Kanagawa (JP); Toshihiko Sugimoto, Kanagawa (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/523,044

(22) Filed: Mar. 10, 2000

(30) Foreign Application Priority Data

Aug. 3, 1999 (JP) ................................. 11-219582

(51) Int. Cl.
*G06F 15/00* (2006.01)
*G06F 17/00* (2006.01)
*G06F 17/21* (2006.01)
*G06F 17/24* (2006.01)
*G06F 3/00* (2006.01)

(52) U.S. Cl. ...................... 715/746; 715/531; 715/744; 715/762; 715/765

(58) Field of Classification Search ................ 345/741, 345/743, 746, 771, 866, 762, 765, 744; 715/906, 715/911, 507, 506, 523, 511, 744, 746, 765, 715/780, 740
See application file for complete search history.

(56) References Cited

U.S. PATENT DOCUMENTS 5,179,700 A * 1/1993 Aihara et al. ................ 345/866
5,781,720 A * 7/1998 Parker et al. ............ 395/183.14
6,061,516 A * 5/2000 Yoshikawa et al. ......... 395/702
6,252,591 B1 * 6/2001 Dockweiler et al. ........ 345/744
6,262,729 B1 * 7/2001 Marcos et al. .............. 345/335
6,346,953 B1 * 2/2002 Erlikh et al. ................ 345/762
6,490,601 B1 * 12/2002 Markus et al. .............. 715/507

FOREIGN PATENT DOCUMENTS

| JP | 04-163625 | 6/1992 |
| JP | 04-286002 | 10/1992 |
| JP | 06-028166 | 2/1994 |
| JP | 10-161976 | 6/1998 |
| JP | 2000-259302 | * 9/2000 |

OTHER PUBLICATIONS

Nakajo, M, "Increase in Middleware Products for Connection Linkage from Windows to Multiple Hosts," No. 376, Nikkei Computer, pp. 80-82 (partial translation), Oct. 16, 1995.
Iwatani, H., "Ashamed To Say I Blundered," No. 113, C Magazine, pp. 152-159 (partial translation), May 1, 1999.
Sun Microsystems, Inc., Java Programming Course, pp. 261-271 (partial translation), Oct. 11, 1996.

* cited by examiner

*Primary Examiner*—Raymond J. Bayerl
*Assistant Examiner*—Namitha Pillai
(74) *Attorney, Agent, or Firm*—Greer, Burns & Crain, Ltd.

(57) ABSTRACT

Whether a field is an output field or input/output field is judged from an acquired field attribute. If the field attribute is an input/output field, the field character string of an output field which exists closest to the input/output field is selected as the control name candidate of the field. If the field attribute is an output field, the field character string of the field is selected as the control name candidate of the field. In this way, names related to the field can be assigned as control names on a GUI screen.

9 Claims, 17 Drawing Sheets

| | | FIELD ATTRIBUTE | | | | FIELD CHARACTER STRING |
|---|---|---|---|---|---|---|
| | FIELD STATE | FIELD LENGTH | TYPES | COLOR OF CHARACTER | BACKGROUND COLOR | |
| FIELD INFORMATION 1 | OUTPUT | 11 | ENGLISH OR DIGITS | GREEN | BLACK | |
| FIELD INFORMATION 2 | OUTPUT | 12 | ENGLISH OR DIGITS | YELLOW | BLACK | ADDRESS BOOK |
| FIELD INFORMATION 3 | OUTPUT | 139 | ENGLISH OR DIGITS | GREEN | BLACK | |
| FIELD INFORMATION 4 | OUTPUT | 4 | ENGLISH OR DIGITS | GREEN | BLACK | NAME |
| FIELD INFORMATION 5 | OUTPUT | 5 | ENGLISH OR DIGITS | GREEN | BLACK | |
| FIELD INFORMATION 6 | INPUT/OUTPUT | 15 | ENGLISH OR DIGITS | WHITE | BLACK | XXXXXXXXXXXXXXX |
| FIELD INFORMATION 7 | OUTPUT | 136 | ENGLISH OR DIGITS | GREEN | BLACK | |
| FIELD INFORMATION 8 | OUTPUT | 7 | ENGLISH OR DIGITS | GREEN | BLACK | ADDRESS |
| FIELD INFORMATION 9 | OUTPUT | 2 | ENGLISH OR DIGITS | GREEN | BLACK | |
| FIELD INFORMATION 10 | INPUT/OUTPUT | 30 | ENGLISH OR DIGITS | WHITE | BLACK | XXXXXXXXXXXXXXXXXXXXXXXXXXXXXX |
| FIELD INFORMATION 11 | OUTPUT | 50 | ENGLISH OR DIGITS | GREEN | BLACK | |
| FIELD INFORMATION 12 | INPUT/OUTPUT | 30 | ENGLISH OR DIGITS | WHITE | BLACK | XXXXXXXXXXXXXXXXXXXXXXXXXXXXXX |
| FIELD INFORMATION 13 | OUTPUT | 121 | ENGLISH OR DIGITS | GREEN | BLACK | |
| FIELD INFORMATION 14 | OUTPUT | 4 | ENGLISH OR DIGITS | GREEN | BLACK | TEL |
| FIELD INFORMATION 15 | OUTPUT | 5 | ENGLISH OR DIGITS | GREEN | BLACK | |
| FIELD INFORMATION 16 | INPUT/OUTPUT | 15 | ENGLISH OR DIGITS | WHITE | BLACK | XXXXXXXXXXXXXXX |
| FIELD INFORMATION 17 | OUTPUT | 136 | ENGLISH OR DIGITS | GREEN | BLACK | |
| FIELD INFORMATION 18 | OUTPUT | 8 | ENGLISH OR DIGITS | GREEN | BLACK | BIRTHDAY |
| FIELD INFORMATION 19 | OUTPUT | 1 | ENGLISH OR DIGITS | GREEN | BLACK | |
| FIELD INFORMATION 20 | INPUT/OUTPUT | 8 | DIGITS | WHITE | BLACK | 99999999 |
| FIELD INFORMATION 21 | OUTPUT | 143 | ENGLISH OR DIGITS | GREEN | BLACK | |

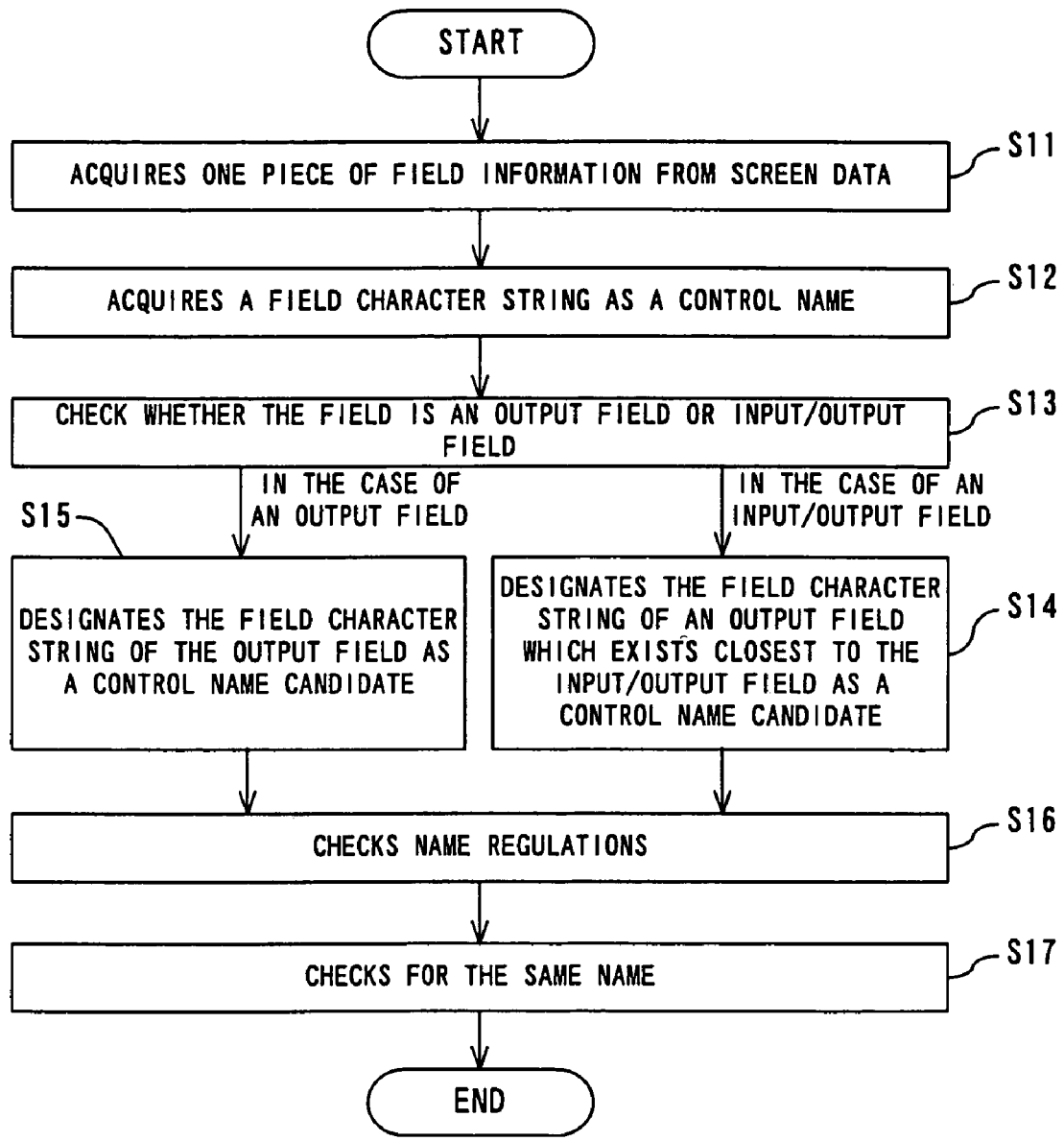
F I G. 3

STRUCTURE OF SCREEN DATA
STRUCTURE OF FIELD INFORMATION
FIG. 4

| | FIELD STATE | FIELD ATTRIBUTE | | | | FIELD CHARACTER STRING |
|---|---|---|---|---|---|---|
| | | FIELD LENGTH | TYPES | COLOR OF CHARACTER | BACKGROUND COLOR | |
| FIELD INFORMATION 1 | OUTPUT | 11 | ENGLISH OR DIGITS | GREEN | BLACK | |
| FIELD INFORMATION 2 | OUTPUT | 12 | ENGLISH OR DIGITS | YELLOW | BLACK | ADDRESS BOOK |
| FIELD INFORMATION 3 | OUTPUT | 139 | ENGLISH OR DIGITS | GREEN | BLACK | |
| FIELD INFORMATION 4 | OUTPUT | 4 | ENGLISH OR DIGITS | GREEN | BLACK | NAME |
| FIELD INFORMATION 5 | OUTPUT | 5 | ENGLISH OR DIGITS | GREEN | BLACK | |
| FIELD INFORMATION 6 | INPUT/OUTPUT | 15 | ENGLISH OR DIGITS | WHITE | BLACK | xxxxxxxxxxxxxxx |
| FIELD INFORMATION 7 | OUTPUT | 136 | ENGLISH OR DIGITS | GREEN | BLACK | |
| FIELD INFORMATION 8 | OUTPUT | 7 | ENGLISH OR DIGITS | GREEN | BLACK | ADDRESS |
| FIELD INFORMATION 9 | OUTPUT | 2 | ENGLISH OR DIGITS | GREEN | BLACK | |
| FIELD INFORMATION 10 | INPUT/OUTPUT | 30 | ENGLISH OR DIGITS | WHITE | BLACK | xxxxxxxxxxxxxxxxxxxxxxxxxxxxxx |
| FIELD INFORMATION 11 | OUTPUT | 50 | ENGLISH OR DIGITS | GREEN | BLACK | |
| FIELD INFORMATION 12 | INPUT/OUTPUT | 30 | ENGLISH OR DIGITS | WHITE | BLACK | xxxxxxxxxxxxxxxxxxxxxxxxxxxxxx |
| FIELD INFORMATION 13 | OUTPUT | 121 | ENGLISH OR DIGITS | GREEN | BLACK | |
| FIELD INFORMATION 14 | OUTPUT | 4 | ENGLISH OR DIGITS | GREEN | BLACK | TEL |
| FIELD INFORMATION 15 | OUTPUT | 5 | ENGLISH OR DIGITS | GREEN | BLACK | |
| FIELD INFORMATION 16 | INPUT/OUTPUT | 15 | ENGLISH OR DIGITS | WHITE | BLACK | xxxxxxxxxxxxxxx |
| FIELD INFORMATION 17 | OUTPUT | 136 | ENGLISH OR DIGITS | GREEN | BLACK | |
| FIELD INFORMATION 18 | OUTPUT | 8 | ENGLISH OR DIGITS | GREEN | BLACK | BIRTHDAY |
| FIELD INFORMATION 19 | OUTPUT | 1 | ENGLISH OR DIGITS | GREEN | BLACK | |
| FIELD INFORMATION 20 | INPUT/OUTPUT | 8 | DIGITS | WHITE | BLACK | 99999999 |
| FIELD INFORMATION 21 | OUTPUT | 143 | ENGLISH OR DIGITS | GREEN | BLACK | |

| | CLASS | NAME |
|---|---|---|
| FIELD INFORMATION 2 | STATIC | ADDRESSBOOK |
| FIELD INFORMATION 4 | STATIC | NAME-TITLE |
| FIELD INFORMATION 6 | EDIT | NAME |
| FIELD INFORMATION 8 | STATIC | ADDRESS-TITLE |
| FIELD INFORMATION 10 | EDIT | ADDRESS1 |
| FIELD INFORMATION 12 | EDIT | ADDRESS2 |
| FIELD INFORMATION 14 | STATIC | TEL-TITLE |
| FIELD INFORMATION 16 | EDIT | TEL |
| FIELD INFORMATION 18 | STATIC | BIRTHDAY-TITLE |
| FIELD INFORMATION 20 | EDIT | BIRTHDAY |

FIG. 11

FILE(F) EDIT(E) DISPLAY(V)

ADDRESS BOOK

NAME      XXXXXXXXXXXXXX

ADDRESS   XXXXXXXXXXXXXXXXXXXXXXXXX
          XXXXXXXXXXXXXXXXXXXXXXXXXX

TEL       XXXXXXXXXXXX

BIRTHDAY  99999999

FIG. 12

| FILE(F) | EDIT(E) | COMMUNICATION RECORD (C) | | | | | | | |
|---|---|---|---|---|---|---|---|---|---|
| HIERARCHY | DETAIL | SOURCE | | | | | | | |
| ☐ ADDRESS BOOK<br>└─ 🗎 ADDRESS BOOK .scp<br>     🗎 SCREEN .rcd | | | | | | | | | |

| | TITLE | COMMUNICATION TARGET | ATTRIBUTE | LINE | COLUMN | ITEM LENGTH | INPUT/OUTPUT |
|---|---|---|---|---|---|---|---|
| 1 | ITEM 1 | | | 1 | 2 | 9 | OUTPUT |
| 2 | ADDRESS BOOK | | | 1 | 12 | 12 | OUTPUT |
| 3 | ITEM 3 | | | 1 | 25 | 137 | OUTPUT |
| 4 | NAME-TITLE | | | 3 | 3 | 4 | OUTPUT |
| 5 | ITEM 5 | | | 3 | 8 | 3 | OUTPUT |
| 6 | NAME | ✓ | ✓ | 3 | 12 | 15 | INPUT/OUTPUT |
| 7 | ITEM 7 | | | 3 | 28 | 134 | OUTPUT |
| 8 | ADDRESS-TITLE | ✓ | ✓ | 5 | 3 | 7 | OUTPUT |
| 9 | ADDRESS 1 | ✓ | ✓ | 5 | 12 | 30 | INPUT/OUTPUT |
| 10 | ITEM 10 | | | 5 | 43 | 48 | OUTPUT |
| 11 | ADDRESS 2 | ✓ | ✓ | 6 | 12 | 30 | INPUT/OUTPUT |
| 12 | ITEM 12 | | | 6 | 43 | 119 | OUTPUT |

FIG. 14

FILE(F)  EDIT(E)  //COMMUNICATION RECORD(C)//

| HIERARCHY | DETAIL | SOURCE | | TITLE | COMMUNICATION TARGET | ATTRIBUTE | LINE | COLUMN | ITEM LENGTH | INPUT/OUTPUT |
|---|---|---|---|---|---|---|---|---|---|---|
| ADDRESS BOOK | | | | ITEM 1 | | | 1 | 2 | 9 | OUTPUT |
| ADDRESS BOOK scp | | | | ADDRESS BOOK | | | 1 | 12 | 12 | OUTPUT |
| SCREEN rcd | | | | ITEM 3 | | | 1 | 25 | 137 | OUTPUT |
| | | | | NAME-TITLE | | ✓ | 3 | 3 | 4 | OUTPUT |
| | | //SCREEN GENERATION(F)// | | ITEM 5 | | | 3 | 8 | 3 | OUTPUT |
| | | | 6 | NAME | ✓ | | 3 | 12 | 15 | INPUT/OUTPUT |
| | | | 7 | ITEM 7 | | ✓ | 3 | 28 | 134 | OUTPUT |
| | | | 8 | ADDRESS-TITLE | ✓ | | 5 | 3 | 7 | OUTPUT |
| | | | 9 | ADDRESS 1 | | ✓ | 5 | 12 | 30 | INPUT/OUTPUT |
| | | | 10 | ITEM 10 | | | 5 | 43 | 48 | OUTPUT |
| | | | 11 | ADDRESS 2 | ✓ | | 6 | 12 | 30 | INPUT/OUTPUT |
| | | | 12 | ITEM 12 | | | 6 | 43 | 119 | OUTPUT |

FIG. 15

GUI SCREEN GENERATING APPARATUS, GUI SCREEN GENERATING METHOD AND STORAGE MEDIUM RECORDING GUI SCREEN GENERATING PROGRAM

BACKGROUND OF THE INVENTION

1. Field of the Invention

The present invention relates to an apparatus generating a graphical user interface (GUI) screen based on the screen data of a character-based user interface screen, a method generating a GUI screen and a storage medium recording a GUI screen generating program.

2. Description of the Related Art

With the increasing speed and decreasing cost of personal computers and a request on a client-server type operation form, it is requested to convert an existing host-centered process user interface to a client-server type graphical user interface.

It is necessary to determine the name of a control laid out on a GUI screen in order to convert a host-centered type character-based user interface (hereinafter called "CUI") screen to a graphical user interface (hereinafter called "GUI") screen. However, since a name used to specify a field is not defined in the screen data of a CUI screen, it is necessary to specify a control name corresponding to each field of the CUI screen.

SUMMARY OF THE INVENTION

When a control name was specified, conventionally a control name was mechanically determined regardless of the contents of individual output and input/output fields. Therefore, the control name could not be guessed from the purpose for use or for utilization and thereby a programmer had to expend a lot of time and energy when he/she performed the maintenance of a generated GUI screen. Since the control name was mechanically determined, there was a possibility that a similar name may be assigned and thereby an error easily occurred at the time of programming. In order to change the assigned control name to a name easily identified by a business developer, a GUI screen generated by the business developer had to be edited using a GUI screen editing tool and the editing work was troublesome.

An object of the present invention is to make it possible to specify controls in such a way that a control laid out on a GUI screen can be easily identified.

The GUI screen generating apparatus of the present invention comprises an extraction unit extracting field information from the screen data of a character-based user interface screen and a naming unit naming a control on a graphical user interface screen corresponding to the field information according to the field information extracted by the extraction unit.

According to this invention, when a character-based user interface screen is converted to a graphical user interface screen, a control on the graphical user interface is named according to the field information of the character-based interface screen. Therefore, the correspondence between the field information of a CUI and the control name of a GUI can be easily understood and thereby both the editing work efficiency of a program and the correction work efficiency of the edited program are improved.

BRIEF DESCRIPTION OF THE DRAWINGS

FIG. 3 is a flowchart showing the operation of a GUI screen production unit.

FIG. 4 shows both the structure of screen data and the structure of field information.

FIG. 7 shows the layout of a CUI screen.

FIG. 10 shows an example of the screen data of a CUI screen.

FIG. 11 shows the classes and names of controls laid out on a GUI screen.

FIG. 12 shows an example display of a CUI screen.

FIG. 14 shows titles extracted from the screen data of a CUI screen.

FIG. 15 shows a display state in the case where a GUI screen is generated.

DESCRIPTION OF THE PREFERRED EMBODIMENT

The preferred embodiment of the present invention is described below with reference to the drawings. First, the basic configuration of the GUI screen generating apparatus in a preferred embodiment of the present invention is described with reference to FIG.

Figure 1:
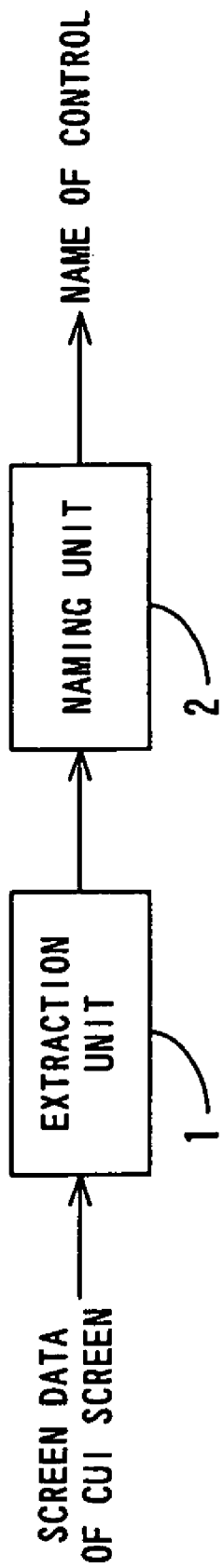
FIG. 1 shows the basic configuration of a preferred embodiment.

In FIG. 1, the extraction unit 1 extracts field information from the screen data of a character-based user interface screen. The naming unit 2 specifies the control name of a graphical user interface screen according to the field information extracted from the extraction unit 1.

Since the control name of a graphical user interface (GUI) screen are specified according to the field information of a character-based user interface (CUI), the correspondence between the field of a CUI screen and the control name of a GUI screen can be easily understood and a program to convert the CUI screen to a GUI screen can be easily prepared. The program can be easily maintained.

The naming unit 2, for example, analyzes field information, and if the class of the field information is an input/output field, the control name of the GUI screen is specified based on the field character string of an output field in the vicinity of the input/output field.

In this way, the control name is specified in relation to the content of the input/output field. Therefore, when a program is generated or when the program is corrected, the nature of the control can be understood and the generation and correction of a program can be efficiently performed.

Figure 2:
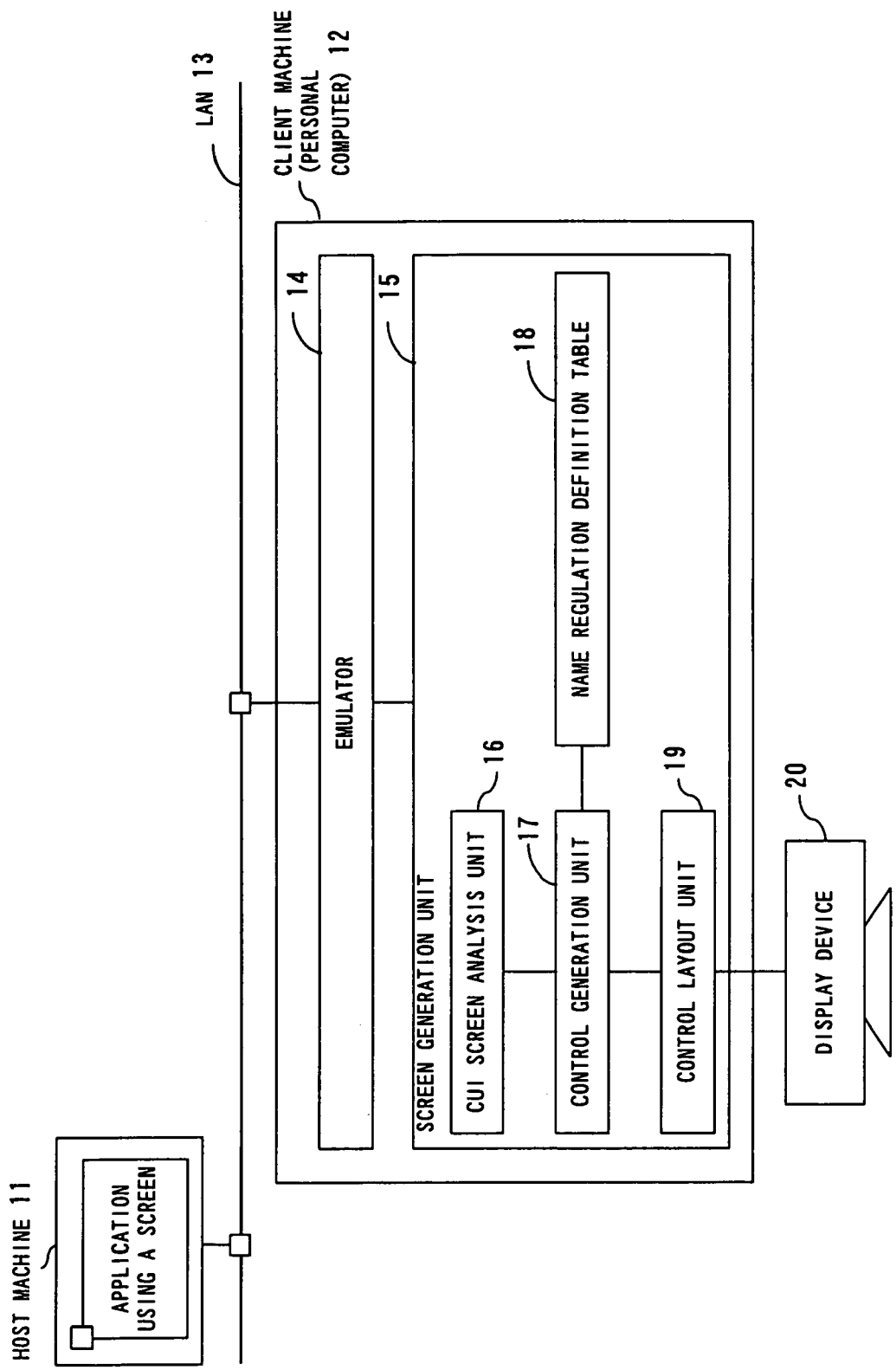
FIG. 2 shows the system configuration of the preferred embodiment.

FIG. 2 shows the system configuration of the host-centered type system in a preferred embodiment of the present invention.

In the system of the preferred embodiment, a host machine (hereinafter called a "host") 11 is connected with a plurality of client machines (for example, personal computers, etc.) 12 via a LAN 13.

The client machine (hereinafter called a "client") 12 comprises an emulator 14 storing the screen data of a character-based user interface (hereinafter called a "CUI") screen which are transmitted from the host 11, and a GUI screen production unit (GUI screen generating apparatus) 15 converting the screen data of a GUI screen to the screen data of the CUI screen stored in the emulator 14. In this preferred embodiment, the client 12 is composed, for example, of a personal computer, etc. The emulator 14 and GUI screen production unit 15 are realized as a program for a development tool used in the client 12.

The GUI screen generation unit 15 includes a CUI screen analysis unit 16 analyzing the field information of the screen data of a CUI, a control generation unit 17 specifying the control name of a GUI screen according to a name regulation definition table 18, etc., and a control layout unit 19 determining the layout of controls on the GUI screen.

Furthermore, a display unit 20 displaying the screen data of a generated GUI is connected to the client 12.

Next, the operation of the GUI screen generation unit 15 with such a configuration, is described with reference to the flowchart shown in FIG. 3.

The GUI screen generation unit 15 acquires field information from the screen data of the CUI stored in the emulator 14 (S11 shown in FIG. 3). Furthermore, the screen generation unit 15 acquires the field character string of the field information as a control name candidate (S12).

The screen data of a CUI screen are composed of a plurality of pieces of field information, as shown in FIG. 4, and each piece of the field information is composed of information indicating whether the field is an output field or input/output field, field attribute information consisting of field length information, a data type to be displayed or inputted, etc., and a field character string.

Returning to FIG. 3, the screen generation unit 15 judges whether the field is an output field or input/output field, from the field attribute of the acquired field (S13).

If the attribute of the field is an input/output field, the field character string of an output field which exists before the input/output field and closest to the input/output field is designated as a control name candidate (S14).

If the attribute of the field is an output field, the field character string is designated as the control name (S15).

Then, the screen generation unit 15 references the name regulation definition table 18 and checks whether the control name candidate satisfies the name regulations of the name regulation definition table 18 (S16).

Figure 5:
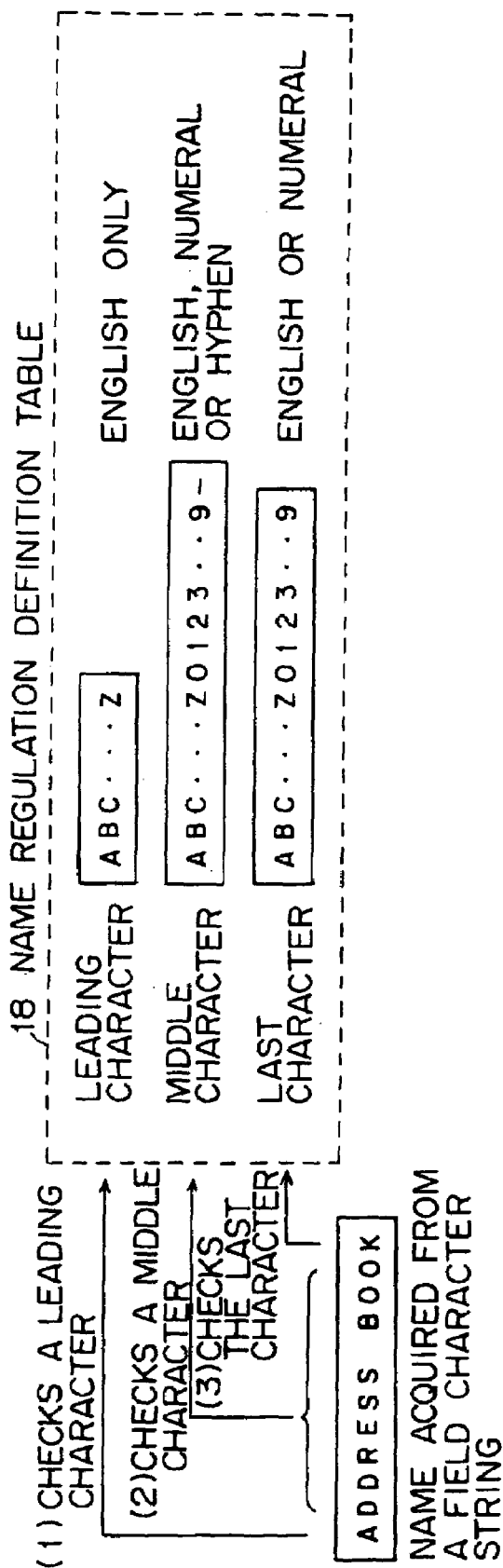
FIG. 5 shows an example of a name regulation definition table.

The name regulation definition table 18 defines characters which are permitted for use as a control name, and for example, the kinds of permitted characters are defined for each of a leading character, an middle character and a last character, as shown in FIG. 5.

If a control name candidate acquired from a field character string is assumed to be "ADDRESS BOOK", as shown in FIG. 5, the leading character is "A", whereas a leading character defined in the name regulation definition table 18 shown in FIG. 5 is "English only". Therefore, the leading character satisfies the name regulation. The middle character of the candidate consists of "English and a blank", whereas the name of a middle character defined in the name regulation definition table 18 is "English, digit or hyphen". Therefore, the middle character of the candidate does not satisfy the name regulations. "Blank" in the control name is deleted accordingly. Furthermore, the last character of the control name is "K", whereas the last character defined in the name regulation definition table 18 is "English or digit". Therefore, the last character satisfies the name regulations.

As a result of the above-described name regulation check, for example, "ADDRESSBOOK" obtained by deleting "blank" from the control name candidate "ADDRESS BOOK" is selected as a new candidate for the control name.

Returning to FIG. 3, after completing the name regulation check in step S16, the screen generation unit 15 proceeds to the same name check in step S17.

Figure 6:
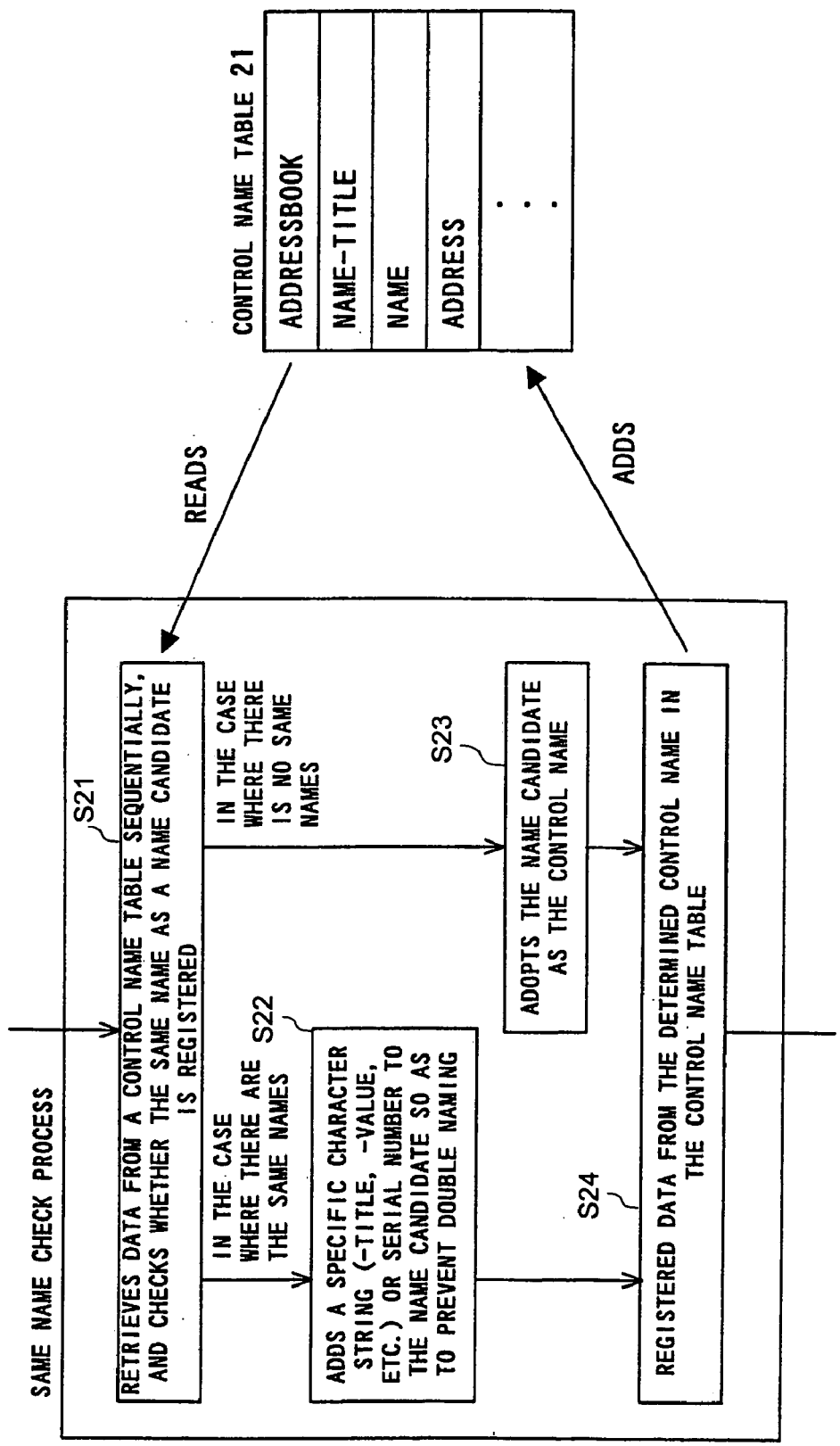
FIG. 6 is a flowchart showing the same name checking process.

FIG. 6 is a flowchart showing the same name check process. First, the GUI screen generation unit 15 sequentially retrieves data from a control name table 21 registering assigned control names and judges whether the same name as the control name candidate is registered (S21 shown in FIG. 6).

The control name table 21 registers the names of controls already laid out on a GUI screen. In this preferred embodiment, "ADDRESSBOOK", "NAME-TITLE", etc., are registered as assigned control names, as shown in FIG. 6.

If the same name as the name candidate is registered in the control name table 21, a specific character string (including a numeral and a serial number) is added to the name candidate or assigned control name in order to prevent double naming (S22).

If the same name as the name candidate is not registered in the control name table 21, the name candidate is adopted as the control name of the field (S23). Furthermore, the adopted control name is registered in the control name table 21 (S24).

By the above-described process, the name obtained by adding a specific character string to the character string of an output field in the vicinity of the input/output field of a CUI screen or the character string itself, is set as the control name. Therefore, from the control name it can be judged which field the data often output or input/output field is related to. Therefore, a program can be easily corrected and mistakes in programming can be reduced.

Figure 7:
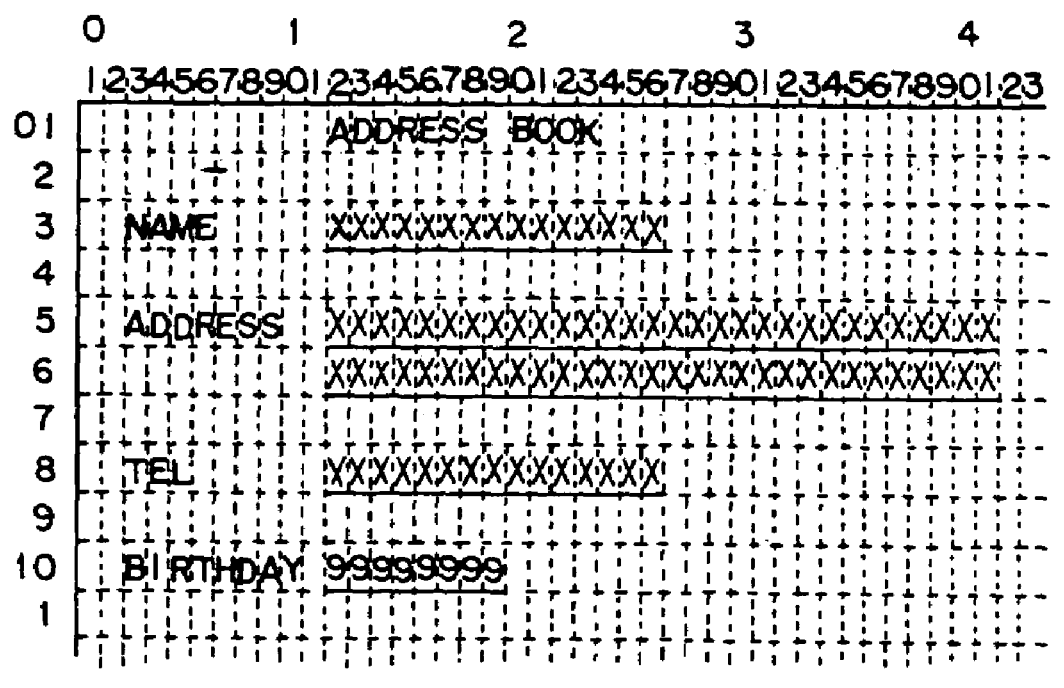
Figures 8A, 8B:
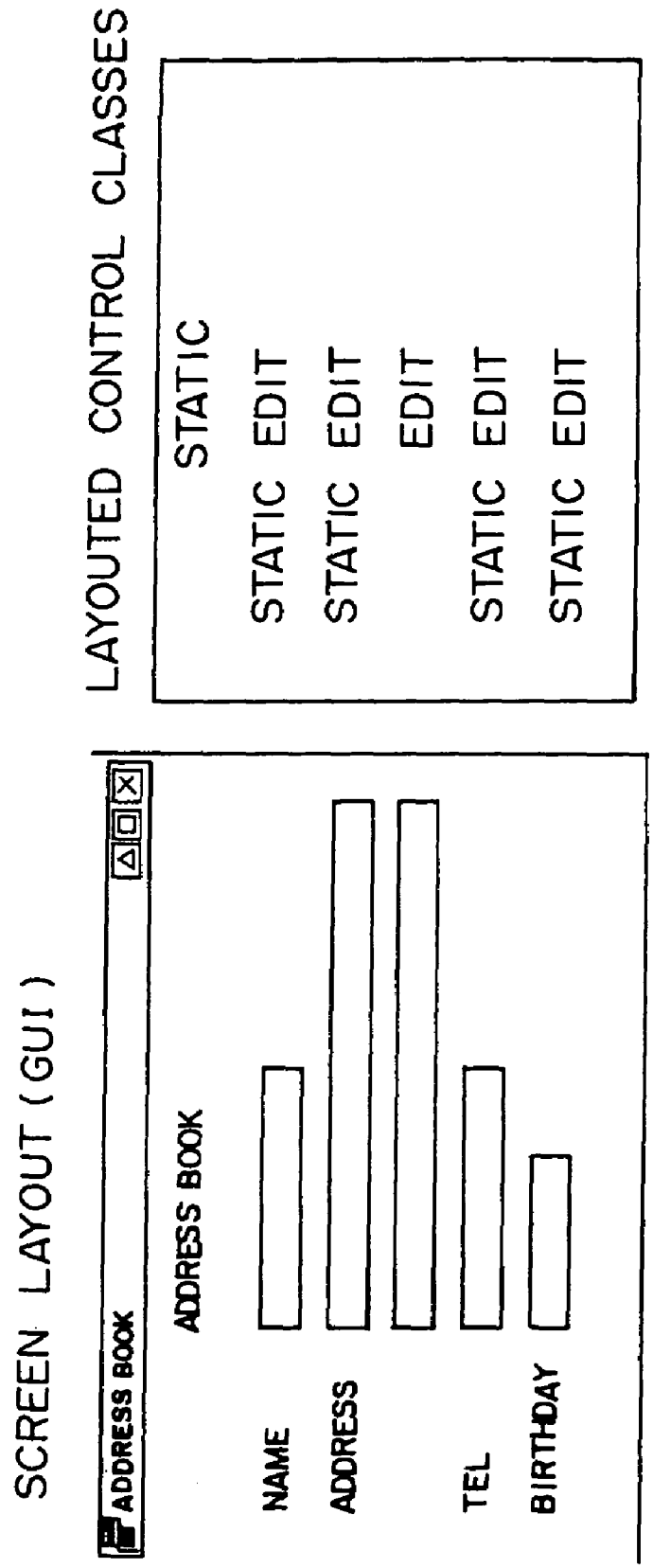
FIGS. 8A and 8B show both the layout of a GUI screen and the classes of the controls.
Figure 9:
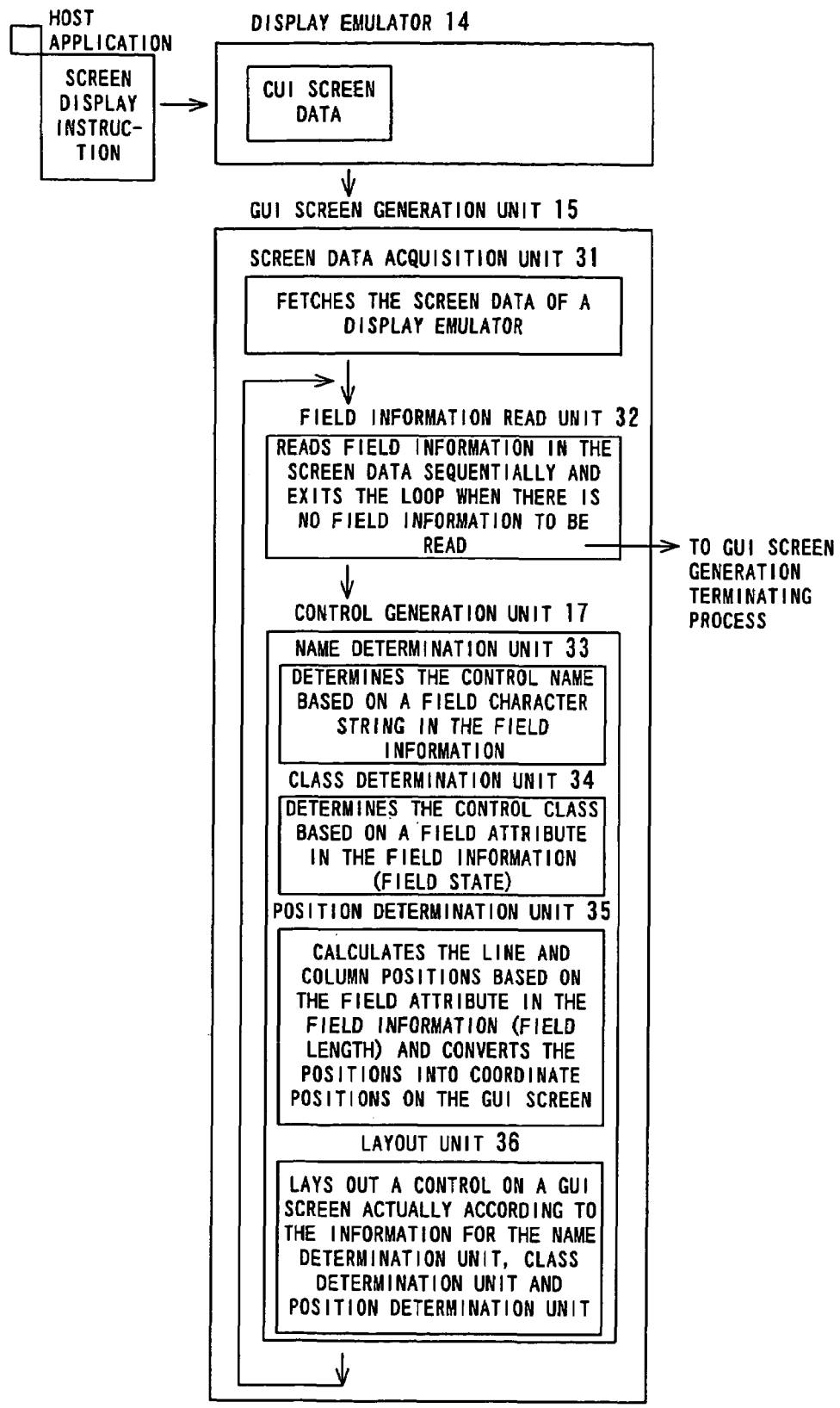
FIG. 9 shows the processes of a GUI screen production unit 15.

Next, FIG. 9 shows the process of the GUI screen generation unit 15 in the case where the GUI screen shown in FIG. 8 is converted from the CUI screen shown in FIG. 7.

The application program of the host 11 performs a picture display instruction and transmits the screen data of a CUI screen to the client 12. The emulator 14 of the client 12 stores the screen data of the CUI screen.

The screen data acquisition unit 31 of the GUI screen generation unit 15 fetches the screen data of the CUI screen of the emulator 14. Then, a field information read unit 32 reads field information from the screen data. At this time, if there is no field information to be read, the flow exits the loop and proceeds to the termination process of the GUI screen generation.

FIG. 10 shows example screen data of a CUI screen. For example, as to the first piece of field information 1, the field state is output, that is, the field is a display field, the character length is 11 characters and no field string is set. Therefore, nothing is displayed in the corresponding position of the CUI screen.

As for the second piece of field information 2, the field state is output, the character type is English or numeral, the character color is "yellow", the background color is "black" and the field character string is "ADDRESS BOOK". Therefore, a character string "ADDRESS BOOK" is displayed in the corresponding position of the CUI screen.

As for the fourth piece of field information 4, the field state is output, the field length is four characters, the character type is English or numeral, the character color is green, the background color is black and the field character string is "NAME". Therefore, a character string "NAME" is displayed in the corresponding position of the CUI screen.

As for the fifth piece of field information 5, the field state is output, the field length is five characters, the character type is English or numeral and no field character string is set. Therefore, nothing is displayed in the corresponding position of the CUI screen.

Furthermore, as for the sixth piece of field information 6, the field state is input/output, that is, the field is an field which can be inputted and displayed, the field length is 15 characters, the character type is English or numeral, the character color is white, the background color is black and the field character string is "XXX . . . XX". Therefore, a character string "XXX . . . XX" is displayed in the corresponding position of the CUI screen.

To generate a GUI screen, first, a CUI screen as shown in FIG. 7 is displayed. On the CUI screen, for example, a field character string "NAME" is displayed in the corresponding position of the field information 4 shown in FIG. 10. Since no field character string is set, a blank equivalent to five characters of the field length is displayed in the field information 5. As for the field information 6, the field is an input/output field and a character string "XXX . . . XX" is set as a field character string. Therefore, the character string is displayed. Similarly, each display is performed according to each piece of field information of the screen data, and the CUI screen shown in FIG. 7 is displayed based on the screen data shown in FIG. 10.

After field information is read, the class determination unit 34 shown in FIG. 9 judges whether the field is an output field or input/output field, from the field state of the field information and determines the class of the control. Specifically, the class determination unit 34 judges whether the control is static or edit.

Furthermore, a name determination unit 33 determines the control name candidate based on both the field state and field character string. For example, if the field is an output field, the name determination unit 33 selects the field character string as the control name candidate. If the field is an input/output field, the name determination unit 33 selects the field character string of an output field which exists before and closest to a field to be specified, as the control name candidate. At that time, a specific character string is added to an already assigned control name or a newly assigned control name so as to prevent the control name from being the same as the control name of the output field of the naming source. An output field which exists closest to a field to be named means an output field which is found in the first place when the lines of the field are retrieved leftward and the columns are retrieved upward.

FIG. 11 shows the classes and names of controls to be generated by both the above-described name determination unit 33 and class determination unit 34.

As to the field information 2, the field state is output, as seen in FIG. 10. Therefore, static is set as the control class of a control corresponding to the field information 2. Although the field character of the field information 2 is "ADDRESS BOOK", "blank" between characters is not permitted by the name regulations. Therefore, a character string "ADDRESSBOOK" obtained by deleting "blank" is set as the control name.

Then, as for the field information 4, the field state is also output. Therefore, static is set as the control class and a field character string "NAME" is set as the control name.

Then, as for the field information 6, the field state is input/output. Therefore, edit is set as the control class. Since no field character string is set in the field information 6, and the field character string "NAME" of the output field which exists closest to the field is selected as the control name candidate of the field. When a character string "NAME" is selected as the control name candidate of the field information 6, the above-described control name table 21 is referenced and it is checked whether the control name is already registered there. In this example, since the control name "NAME" is already registered in the control name table 21 as the control name of the field information 4, the control name of the field information 4 is modified by adding a specific character string, for example, a character string "-TITLE" to the control name of the field information 4. In this way, the control name of the field information 4 is modified to "NAME-TITLE", and "NAME" is set as the control name of the field information 6. Therefore, the input/output field and the output field in the vicinity of the input/output field are prevented from having the same control name.

As for the field information 10, the field state is also input/output. Therefore, edit is set as the control class, and the character string "ADDRESS" of the output field which exists closest to the field is selected as the control name candidate of the field. At this time, since the control name "ADDRESS" is already registered in the control name table 21 as the field of field information 8, a specific character string "-TITLE" is added to the control name "ADDRESS" of the field information 8 to prevent double naming, and a character string "ADDRESS-TITLE" is set as the control name of the field information 8. Since in this way, double naming of the control name is prevented, a character string "ADDRESS" is set as the control name of the field information 10.

Then, as for field information 12, the field state is input/output. Therefore, edit is set as the control class. Furthermore, since the field is an input/output field, the field character string "ADDRESS" of the output field which exists closest to the field is selected as the control name candidate. At this time, since a character string "ADDRESS" is already registered in the control name table 21 as the control name of the field information 10, the control name of the field information 10 is modified to "ADDRESS1" by adding a serial number to the control name of the field information 10, and simultaneously "ADDRESS2" is set as the control name of the field information 12.

Similarly, "TEL-TITLE" is set as the control name of field information 14, of which the field is an output field, and "TEL" is set as the control name of the corresponding input/output field. Although the field character string of the field information 14 is "TEL.", "TEL" obtained by deleting "." or "TEL-TITLE" is set as the control name since a period "." is not permitted by the name regulations.

Then, the position determination unit 35 shown in FIG. 9 calculates the line and column positions based on the field length in the field information and converts the positions into the coordinates on the GUI screen.

Lastly, a layout determination unit 36 layouts controls on the GUI screen based on the control name determined by the name determination unit 33, the control class determined by the class determination unit 34 and the coordinates determined by the position determination unit 35.

The above-described processes are performed until all the screen data of the CUI screen are read, and when all the screen data are read, the termination process is performed.

By the above-described processes, the GUI screen shown in FIG. 8A can be converted from the CUI screen shown in FIG. 7. FIG. 8B shows the classes of controls laid out on the GUI screen. The class of a control for displaying a character string, such as "NAME", "ADDRESS", etc., is static, and the control class of an input/output field is edit.

Next, the procedures in the case where a GUI screen is converted from a CUI screen for inputting an address, name, birthday, etc., described above are described below with reference to FIGS. 12 through 16.

First, a development tool for generating a GUI screen is started, and the CUI screen for address input shown in FIG. 12 is displayed.

Figure 13:
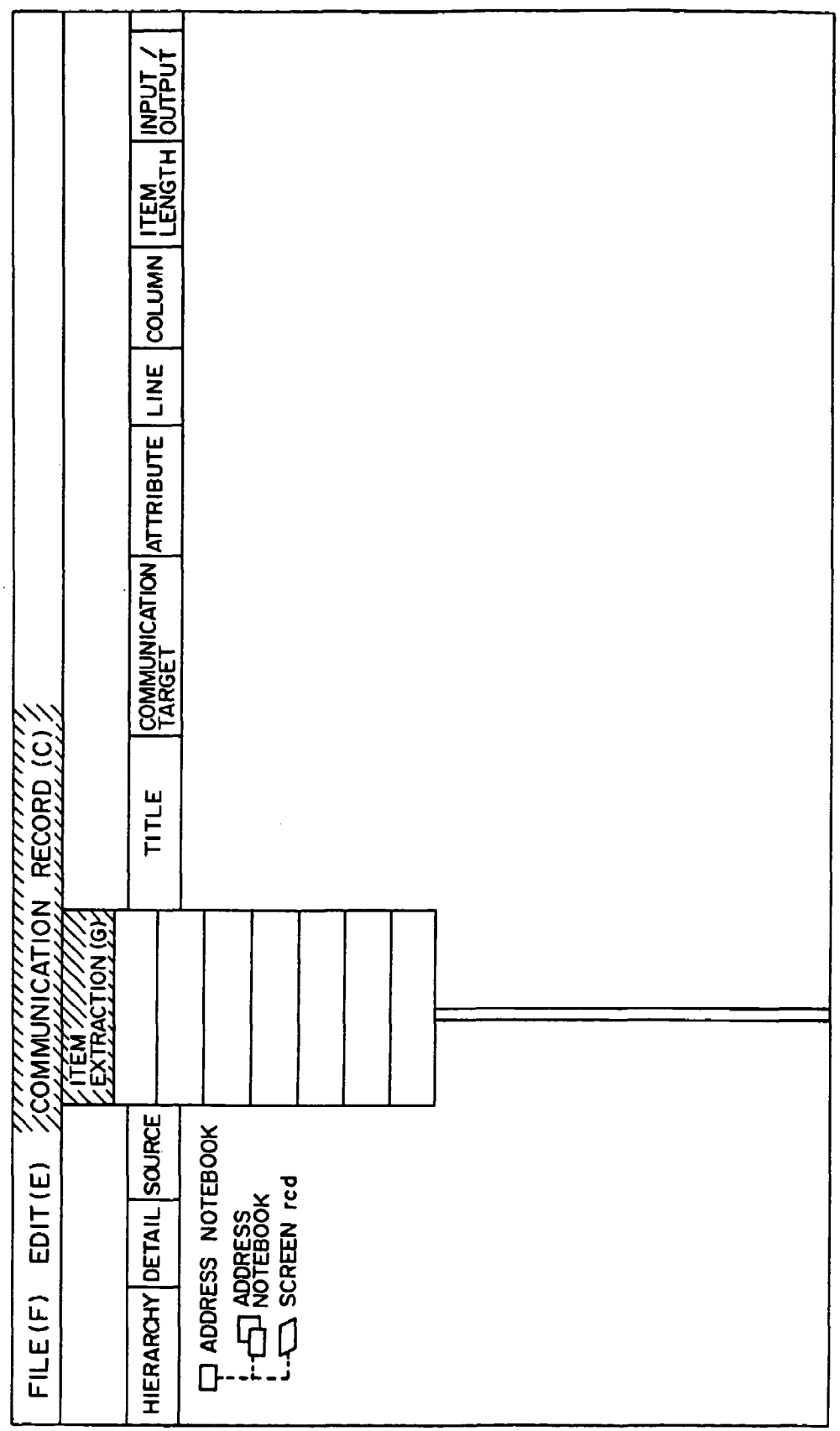
FIG. 13 shows a display state in the case where an item is extracted from a CUI screen.

Then, if the "item extraction" of "communication record" is selected from a pull-down menu, as shown in FIG. 13, a title corresponding to each field of the CUI screen is generated, as shown in FIG. 14.

Of the data shown in FIG. 14, an item with a check mark in the field of "communication target" is an item for which data are transmitted and received between the emulator 14 and the GUI screen control of a client 12, and an item with a check mark in an attribute field is a field for which data about attributes (such as color, input/output state, etc.) are transmitted and received between the emulator 14 and the GUI screen control of the client 12.

Since, as seen from the screen data of the CUI screen shown in FIG. 10, the first field is an output field and a field character string is not set in the field. "TITLEL" is automatically set as the title. Since the second field is an output field and "ADDRESS" is set as a field character string, the field character string "ADDRESS" is set as the title.

Since the fourth field is an output field and "NAME" is set as a field character string, the field character string "NAME" is set as the title.

Since the sixth field is an input/output field, the field character string "NAME" of the third field, which is an output field existing closest to the input/output field is set as the title. The title of the third field is modified from "NAME" to "NAME-TITLE" accordingly.

As described above, data of titles, lines, columns, etc., as shown in FIG. 14 are generated based on the screen data of a CUI screen.

Figure 16:
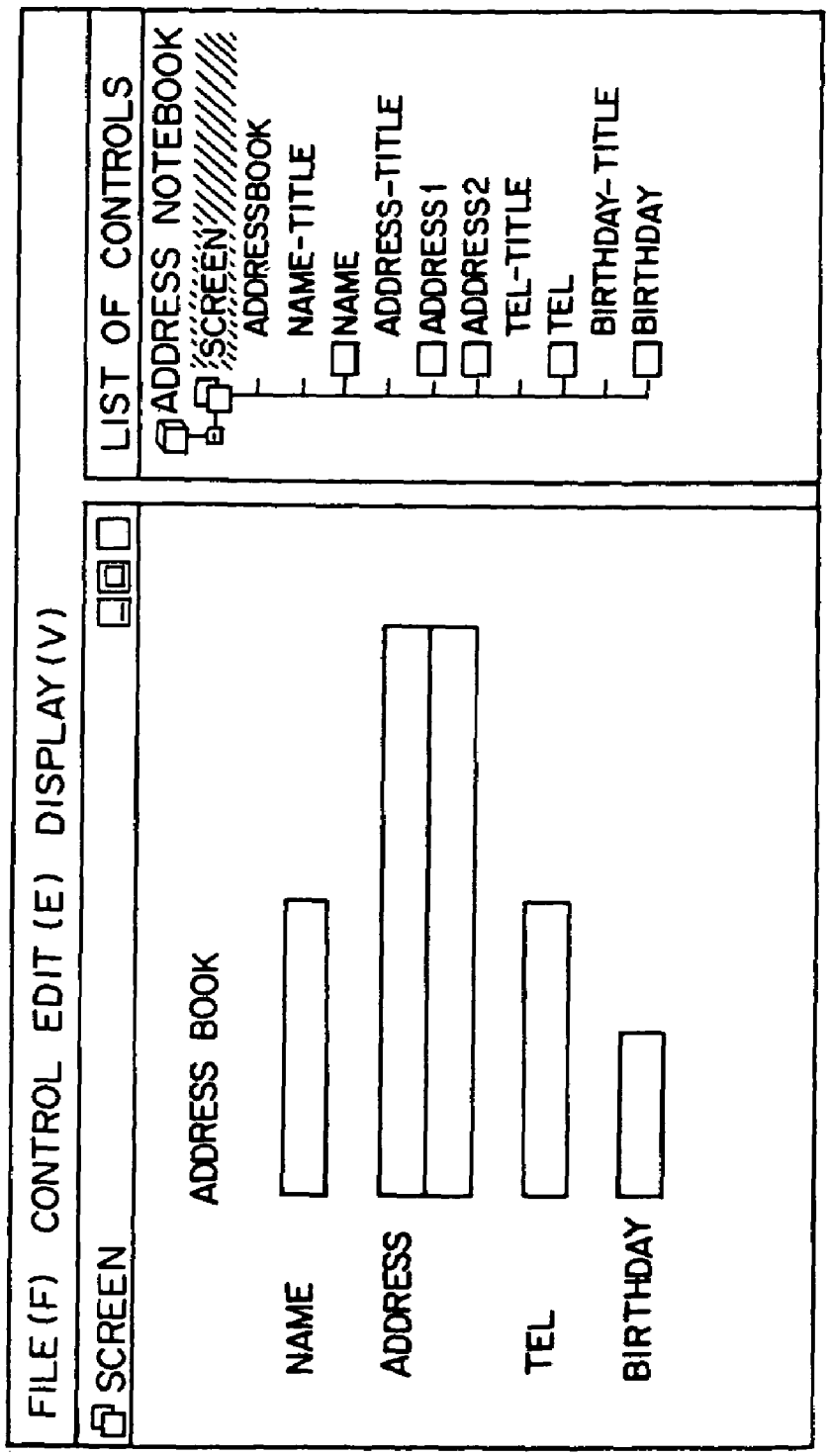
FIG. 16 shows a generated GUI screen.

Then, if "screen generation" of "communication record" is selected from the pull-down menu, as shown in FIG. 15, a GUI screen as shown in FIG. 16 is generated based on the data shown in FIG. 15. In this example, each field character string of the output field shown in FIG. 14 is displayed on the GUI screen, and the input field of each piece of data is displayed. Furthermore, the control names of the automatically generated output fields and input/output fields are displayed in the field of control list.

Specifically, "ADDRESSBOOK" obtained by deleting a blank according to the name regulation is set as the control name of an output field, in which the field character string of the CUI screen is "ADDRESS BOOK" with a blank.

"NAME", which is the field character string of an output field existing closest to the input/output field is set as the control name of the name data input/output field. As a result, the control name of the input/output field becomes the same as the control name of the output field. Therefore, a specific character string is added to the control name of the output field to modify the control name of the output field to "NAME-TITLE". In this way, the control name of the output field and the control name of the input/output field which is specified based on the field character string of the output field can be specified differently.

Similarly, "ADDRESS-TITLE" is set as the control name of an output field which exists closest to the input/output field in such a way the control name of the address input/output field and the control name of an output field immediately before the input/output field are specified differently, and "ADDRESS1" is set as the control name of the upper address input/output field following the control name. The reason why the control name of the upper address input/output field is specified "ADDRESS1" is as follows.

When the control name candidate of a lower address input/output field is determined, "ADDRESS", which is the field character string of an output field existing closest to the input/output field, is selected. As a result, since the name candidate is already registered in the control name table 21 as the control name of the upper input/output field, the control name of the lower input/output field becomes the same as the control name of the upper input/output field. Therefore, to prevent double naming of the control names, "1" is added to the to the control name of the upper address input/output field to modify the control name of the upper address input/output field to "ADDRESS1". "2" is added to the control name candidate of the lower input/output field to set "ADDRESS2" as the control name. Similarly, control names are automatically set in the output and input/output fields of phone number and birthday.

Figure 17:
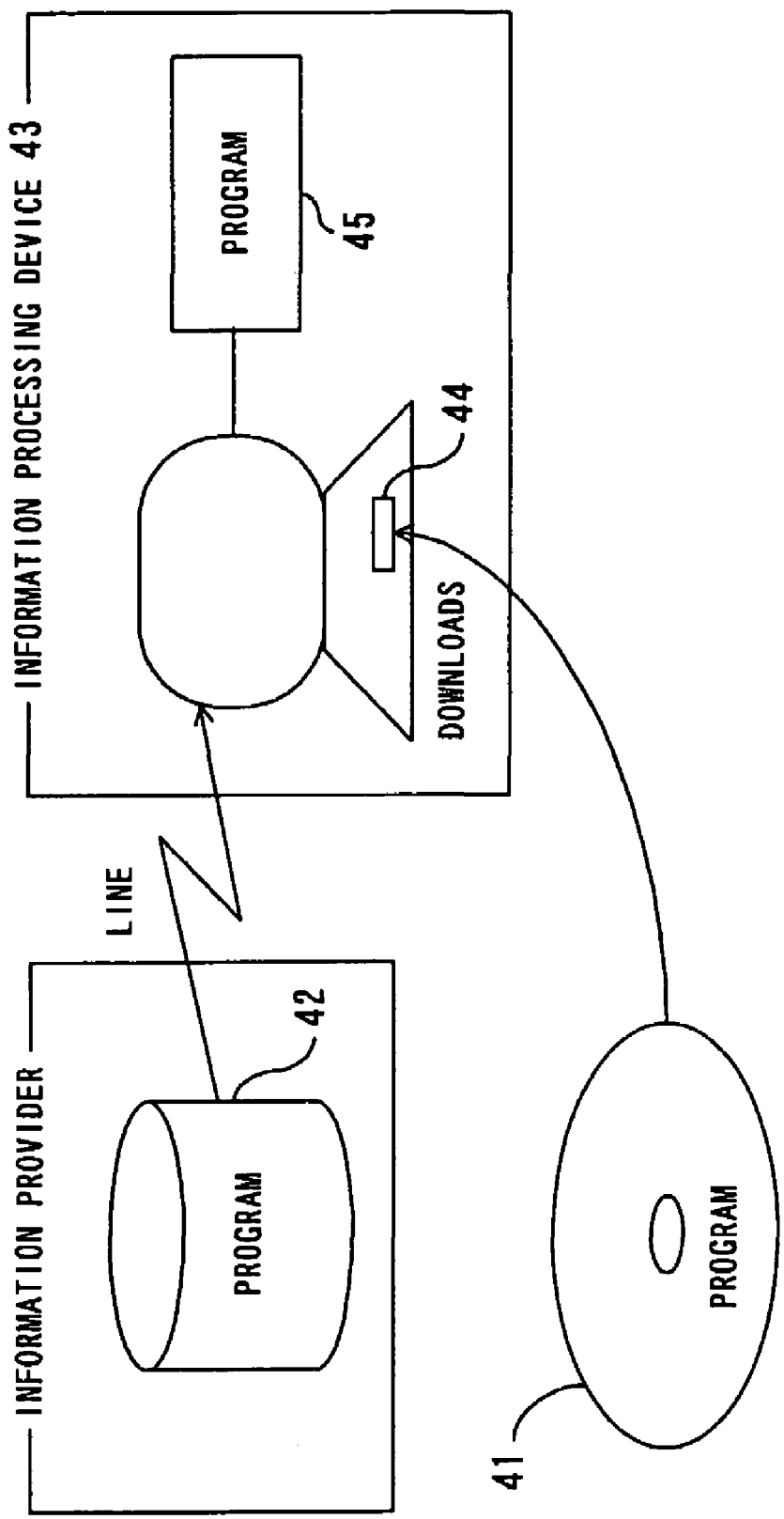
FIG. 17 shows storage media.

FIG. 17 shows the case where a program for realizing the generation function of the GUI screen of the above-described GUI screen generation unit 15 is stored in a portable storage medium 41, such as a CD-ROM, floppy disk, etc., or in a storage device 42 possessed by a program provider and the program is executed by downloading the program to a user's information processing device 43.

If the GUI screen generation program is recorded in a portable storage medium 41, such as a CD-ROM, floppy disk, etc., the program is read by inserting the portable storage medium 41 in the driver unit 44 of the information processing device 43, the program is executed by storing the read program in a memory 45, such as a RAM, hard disk, etc. If the program is provided by a program provider via a communication line, a program stored in the storage device 42, memory, etc., of the program provider is received in the information processing device 43 via the communication line and the program is executed by storing the received program in the memory 45, such as a RAM, hard disk, etc. The program stored in the storage medium 41 can also be a program for realizing a part of the functions described in the preferred embodiment.

According to the above-described preferred embodiment, when a host-centered type CUI screen is converted to a client-server type GUI screen, a name related to the output data or input data of a control can be used as the name of the control on the GUI screen. By doing so, when a program for generating a GUI screen is prepared or the program is maintained, the content of the program can be made easy to understand. Accordingly, the development time required to convert the host-centered type business CUI screen to the client-server type GUI screen can be reduced and the cost required to develop the program can also be reduced.

Although in the above-described preferred embodiment, the GUI screen generating apparatus is realized as a development tool function, the apparatus is not limited to this and can also be realized as a dedicated device. Alternatively, the apparatus can be realized as an application program executed by a personal computer, etc. A network connecting clients 12 is not limited to a LAN and can also be a public network, dedicated line or the Internet.

According to the present invention, when a CUI screen is converted to a GUI screen, for example, a name related to a control can be used as the control name of the GUI screen. Therefore, the generation of a program or the maintenance of the program can be simplified and a host-centered type business user interface can be converted to a client-server type user interface in a shorter time.

The invention claimed is:

1. A graphical user interface screen generating apparatus, comprising:
    an acquiring unit acquiring field attribute data indicating, for each field, whether the field is an output field or input-output field and a character string defined from screen data of a character-based user interface screen;
    a determination unit determining whether each of the fields is an output or input-output field based on the field attribute data acquired by the acquiring unit;
    a naming unit specifying, for an input-output field for which no field name is defined in the character-based user interface screen, a candidate for a control name in the graphical user interface screen based on the character string defined for the output field in a vicinity of the input-output field, wherein
    the determination unit determines whether the candidate for the control name is the same as any control name already assigned for any other output fields or input-output fields; and
    the naming unit registers a name obtained by adding a character or character string to the candidate as the control name of the input-output field when and if the determination unit determines the candidate for the control name is the same as any of the already assigned control names.

2. The graphical user interface screen generating apparatus according to claim 1, wherein said naming unit specifies the control name of the input-output field based on the character string of the output field which is before the input-output field and exists closest to the input-output field.

3. The graphical user interface screen generating apparatus according to claim 1, wherein said naming unit adds a specific character string to one of the registered control name of the input-output field and a registered control name of the output field according to a group of predetermined control name specifying regulations.

4. The graphical user interface screen generating apparatus according to claim 1, wherein,
    the naming unit determines if the candidate complies with naming rules contained in a name regulation definition table, and specifies a character string obtained by removing a part of the candidate character string or adding a number of characters to the candidate character string as the control name of the input-output field when the candidate is determined not to comply with the naming rules.

5. A graphical user interface screen generating method, comprising:
    acquiring field attribute data indicating, for each field, whether the field is an output field or input-output field and a character string defined for each of the output fields from screen data of a character-based user interface screen;
    determining whether each of the fields is an output or input-output field based on the acquired field attribute data;
    specifying, for an input-output field for which no field name is defined in the character-based user interface screen, a candidate for a control name in the graphical user interface screen based on the character string defined for the output field in a vicinity of the input-output field;
    determining whether the candidate for the control name is the same as any control name already assigned for any other output fields or input-output fields; and
    registering a name obtained by adding a character or character string to the candidate as the control name of the input-output string to the candidate as the control name of the input-output field when and if it is determined that the candidate for the control name is the same as any of the already assigned control names.

6. The graphical user interface screen generating method according to claim 5, wherein,
    said specifying comprises determining if the candidate complies with naming rules contained in a name regulation definition table, and specifying a character string obtained by removing a part of the candidate character string or adding a number of characters to the candidate character string as the control name of the input-output field when the candidate is determined not to comply with the naming rules.

7. A computer-readable storage medium on which is recorded a graphical user interface screen generation program enabling a computer to acquire field attribute data indicating, for each field, whether the field is an output field or input-output field and a character string defined for each of the output fields from screen data of a character-based user interface screen, to determine whether each of the fields is an output or input-output field based on the acquired field attribute data, to specify, for an input-output field for which no field name is defined in the character-based user interface screen, a candidate for a control name in a graphical user interface screen based on the character string defined for the output field in a vicinity of the input-output field, to determine whether the candidate for the control name is the same as any control name already assigned for any other output fields or input-output fields, and to register a name obtained by adding a character or character string to the candidate as the control name of the input-output field when and if it is determined that the candidate for the control name is the same as any of the already assigned control names.

8. The computer-readable storage medium according to claim 7 on which is recorded a graphical user interface screen generation program enabling a computer to specify a control name of the input-output field based on the field character string of the output field which is before a field to the input-output field and exists closest to the input-output field.

9. The computer-readable storage medium according to claim 7, wherein,
    the specifying comprises determining if the candidate complies with naming rules contained in a name regulation definition table, and specifying a character string obtained by removing a part of the candidate character string or adding a number of characters to the candidate character string as the control name of the input-output field when the candidate is determined not to comply with the naming rules.

* * * * *